United States Patent
Chan (10) Patent No.: US 8,199,620 B2
(45) Date of Patent: Jun. 12, 2012

(54) METHOD FOR PERFORMING SERVO DEFECT COMPENSATING OPERATION BY COMPENSATING SERVO-RELATED SIGNAL DERIVED FROM READING OPTICAL MEDIUM AND RELATED OPTICAL DISC DRIVE SYSTEM WITH DSP

(75) Inventor: Kun-Yi Chan, Changhua County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 715 days.

(21) Appl. No.: 12/191,320

(22) Filed: Aug. 14, 2008

(65) Prior Publication Data

US 2010/0039913 A1 Feb. 18, 2010

(51) Int. Cl.
*G11B 20/18* (2006.01)

(52) U.S. Cl. ............ 369/53.17; 369/53.15; 369/44.32; 369/53.4

(58) Field of Classification Search .............. 360/31; 369/44.28, 53.15, 44.32, 44.27, 53.16, 53.19
See application file for complete search history.

(56) References Cited

U.S. PATENT DOCUMENTS

| | | | |
|---|---|---|---|
| 4,613,961 A | | 9/1986 | Aarts |
| 5,504,726 A | * | 4/1996 | Semba ............... 369/44.28 |
| 6,445,529 B1 | | 9/2002 | Mahr |
| 2005/0243673 A1 | * | 11/2005 | Yanagawa et al. ...... 369/53.19 |
| 2005/0270942 A1 | * | 12/2005 | King et al. ............ 369/53.15 |
| 2006/0013082 A1 | * | 1/2006 | Ogura et al. ........... 369/44.27 |
| 2007/0230302 A1 | * | 10/2007 | Chen ..................... 369/53.16 |
| 2008/0239536 A1 | * | 10/2008 | Asakura ................... 360/31 |
| 2009/0168616 A1 | * | 7/2009 | Chung et al. ........... 369/44.32 |
| 2011/0044144 A1 | * | 2/2011 | Tada et al. ............. 369/47.49 |

* cited by examiner

*Primary Examiner* — Thuy Pardo
(74) *Attorney, Agent, or Firm* — Winston Hsu; Scott Margo (57) ABSTRACT

A method for performing a servo defect compensating operation by compensating a servo-related signal in an optical disc drive and a related optical disc drive system with a DSP is provided. The method comprises: reading an optical medium by an optical pick-up unit; detecting whether a defect exists by monitoring a side beam signal; when the defect on the optical medium is detected, determining a new compensation value based on a servo error signal; and compensating the servo-related signal with the new compensation value during defect crossing to adjust servo control when the optical pick-up unit passes the defect.

30 Claims, 7 Drawing Sheets

METHOD FOR PERFORMING SERVO DEFECT COMPENSATING OPERATION BY COMPENSATING SERVO-RELATED SIGNAL DERIVED FROM READING OPTICAL MEDIUM AND RELATED OPTICAL DISC DRIVE SYSTEM WITH DSP

BACKGROUND

The present invention relates to servo defect compensating operation of an optical disc drive, and more particularly, to a method of servo defect compensation for a scratch disc and a related optical disc drive system with a digital signal processor (DSP).

In a conventional optical disc drive comprising an optical pick-up unit for reading an optical medium having defects such as a scratch, there is no defect compensation scheme when the optical pick-up unit passes through the defect. The focusing and tracking servo is in a close loop control while reading data from the optical medium, and after the optical pick-up unit passes through the defect, the focusing and tracking servo will probably point at somewhere far from the desired focus/tracking point due to factors such as spindle rotating speed, clamp direction, size of the defect, defect detect level, and digital equalizer design. The focusing and tracking servo traces back using a larger transient response, but the RF quality of data read from the optical medium is typically deteriorated. This issue becomes more serious in high resolution discs such as Blu-ray

SUMMARY OF THE INVENTION

It is therefore one of the objectives of the present invention to provide a method for performing a servo defect compensating operation by compensating a servo-related signal in an optical disc drive and a related optical disc drive system with a DSP, so as to solve the above problem.

In accordance with an embodiment of the present invention, a method for performing a servo defect compensating operation by compensating a servo-related signal in an optical disc drive is disclosed. The method comprises reading an optical medium by an optical pick-up unit; detecting whether a defect exists by monitoring a side beam signal; when the defect on the optical medium is detected, determining a new compensation value based on a servo error signal; and compensating the servo-related signal with the new compensation value during defect crossing to adjust servo control when the optical pick-up unit passes the defect.

In accordance with an embodiment of the present invention, an optical disc drive system for performing a servo defect compensating operation by compensating a servo-related signal is disclosed. The optical drive system comprises an optical pick-up unit and a digital signal processor (DSP). The optical pick-up unit is for reading an optical medium. The DSP is for detecting whether a defect exists by monitoring a side beam signal, and determining a new compensation value based on a servo error signal when the defect on the optical medium is detected, and compensating the servo-related signal with the new compensation value during defect crossing to adjust servo control when the optical pick-up unit passes the defect.

The method and the optical disc drive system with the DSP disclosed by the present invention can perform the servo defect compensating operation in real time for an optical disc drive comprising an optical pick-up unit for reading an optical medium having at least a defect, so as to let the focus/tracking servo approach the focus/tracking point and thereby improve the RF quality.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
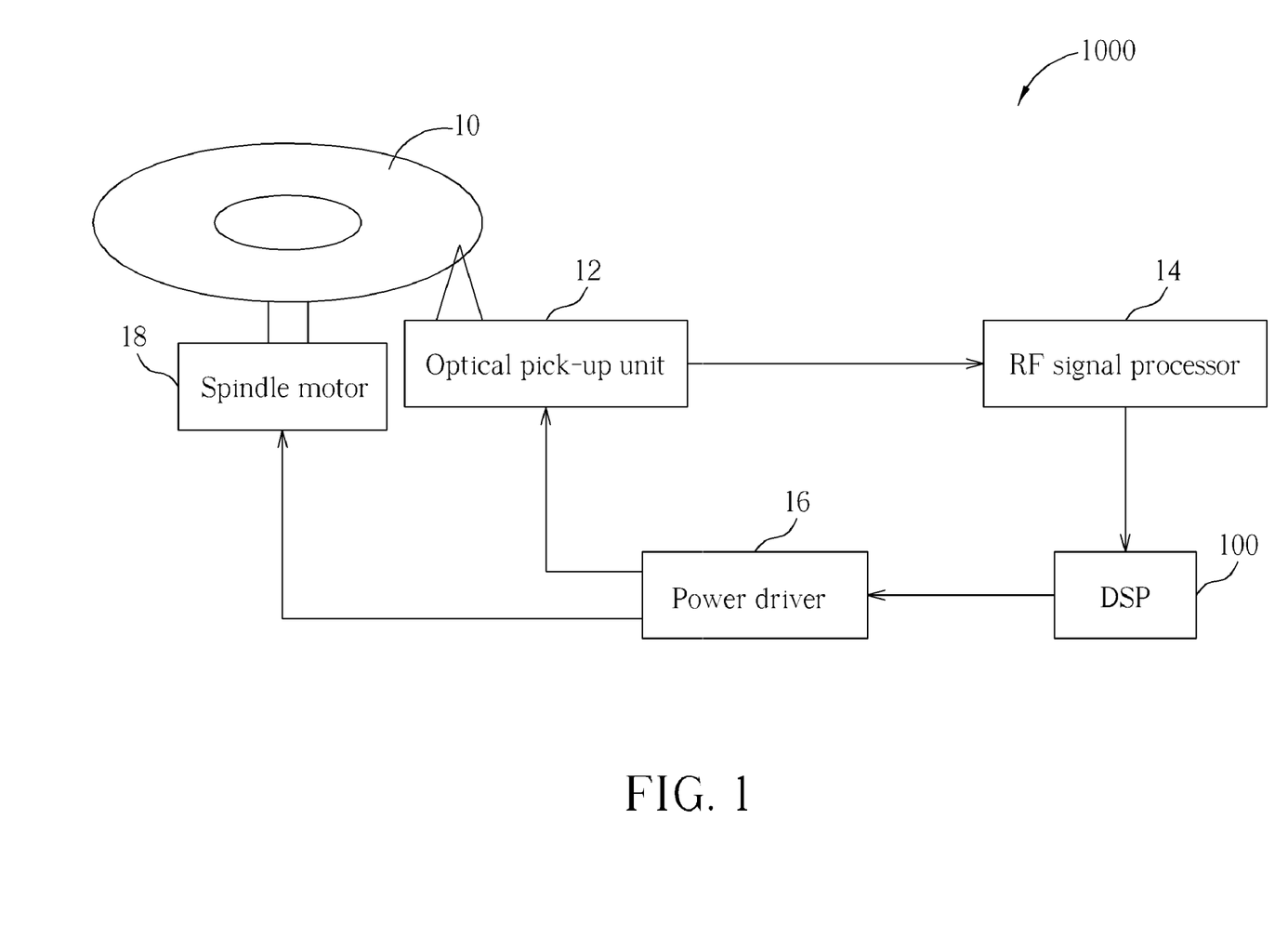
FIG. 1 shows a simplified block diagram of an optical disc drive system in accordance with an embodiment of the invention.
Figure 2:
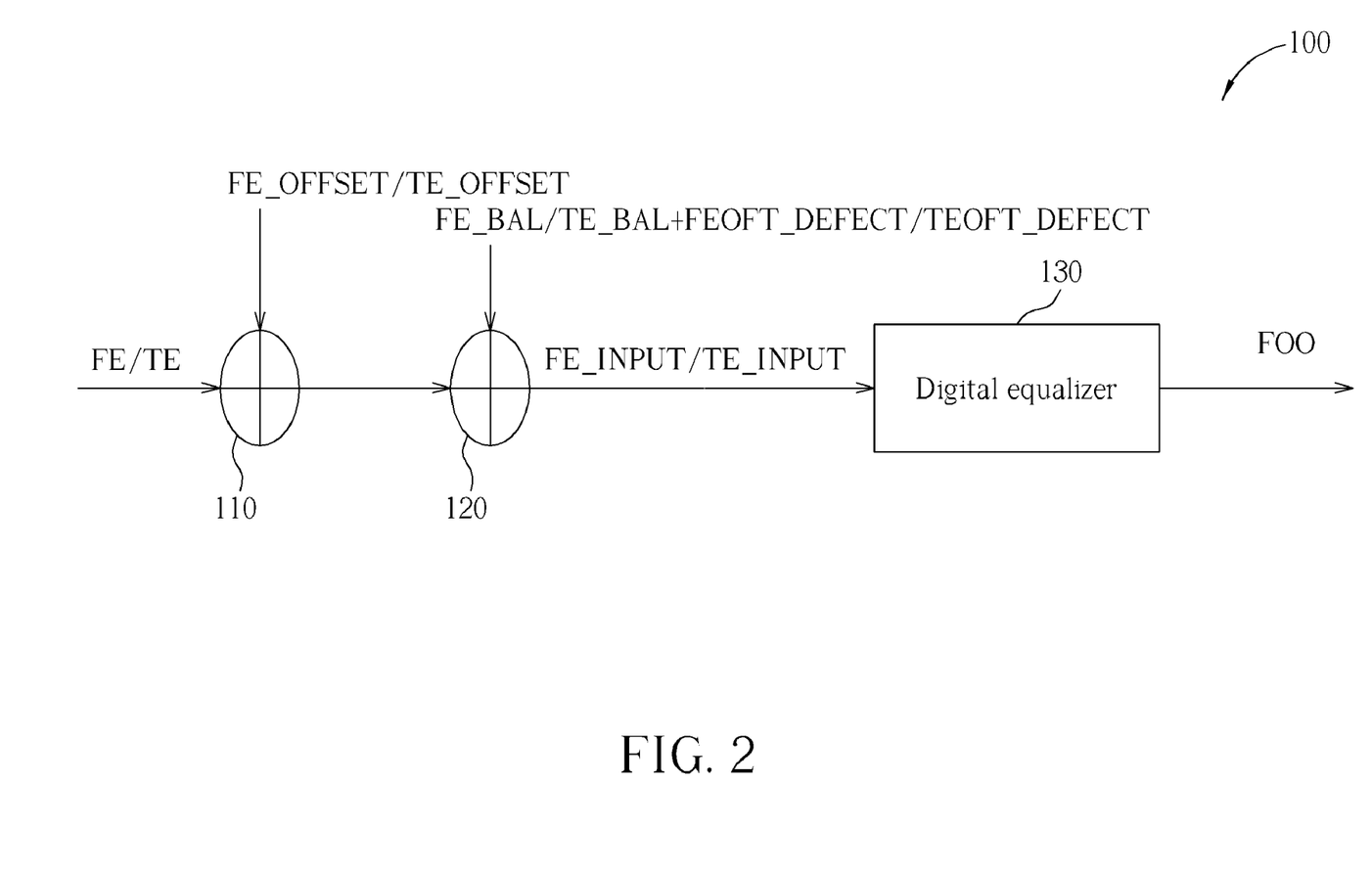
FIG. 2 shows a simplified block diagram of a digital signal processor (DSP) in the optical disc drive in accordance with the first embodiment of the invention.

FIG. 1 shows a simplified block diagram of an optical disc drive system 1000 in accordance with an embodiment of the invention. As shown in FIG. 1, the optical disc drive system 1000 comprises an optical medium 10, an optical pick-up unit 12, an RF signal processor 14, a power driver 16, a spindle motor 18, and a digital signal processor (DSP) 100. FIG. 2 shows a simplified block diagram of the DSP 100 in the optical disc drive system 10 in accordance with a first embodiment of the invention. As shown in FIG. 2, the DSP 100 comprises a first adder 110, a second adder 120, and a digital equalizer 130. The first adder 110 receives and combines the focus error signal FE or tracking error signal TE and an electrical offset FE_OFFSET or TE_OFFSET to generate an output signal. The second adder 120 is coupled to the first adder 110, which receives and combines the output signal, an intentional bias FE_BAL or TE_BAL, and a compensating signal FEOFT_DEFECT or TEOFT_DEFECT to generate an input signal FE_INPUT or TE_INPUT. The digital equalizer 130 is coupled to the second adder 120, which receives the input signal FE_INPUT or TE_INPUT to generate a focusing servo output signal FOO or tracking servo output signal TRO.

Figure 3:
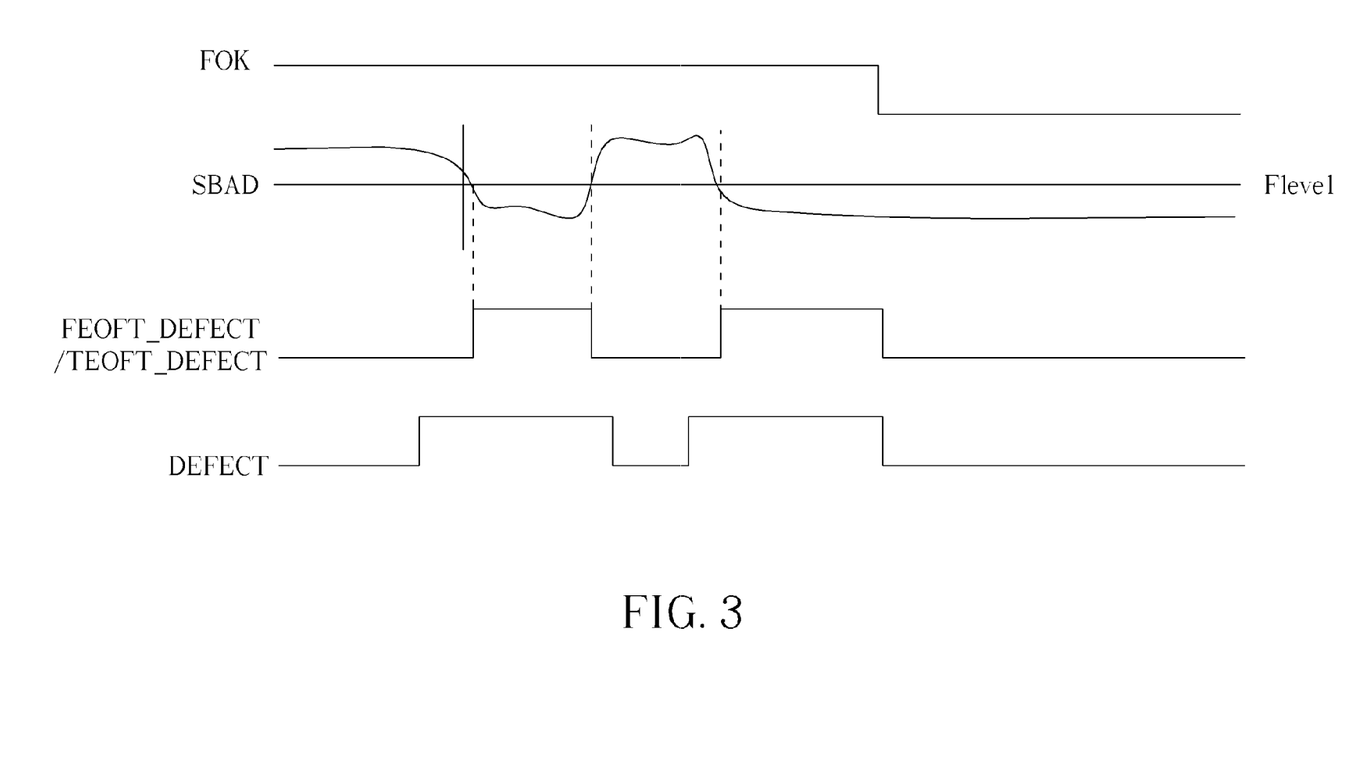
FIG. 3 shows a simplified timing diagram of a focus servo ON OK signal FOK, a sub-beam addition signal SBAD, a defect signal DEFECT, and the compensating signal FEOFT_DEFECT/TEOFT_DEFECT.

FIG. 3 shows a simplified timing diagram of a focus servo ON OK indicator FOK, a sub-beam addition signal SBAD, a defect signal DEFECT, and the previously mentioned compensating signal FEOFT_DEFECT or TEOFT_DEFECT. The sub-beam addition signal SBAD may be a summation of the four light detectors detecting light intensity of the side beams (SBAD=E+F+G+H). As shown in FIG. 2, when the servo is successful focused on and a defect on the optical medium 10 is detected, SBAD is lower than a threshold FLEVEL (SBAD<FLEVEL) and the indicator FOK is high (FOK=1), the compensating signal FEOFT_DEFECT is set to a predicted compensation value FEOFT_PROT or the compensating signal TEOFT_DEFECT is set to a predicted compensation value TEOFT_PROT. When the servo is not yet focused on, FOK is low (FOK=0), or when no defect has been detected, which means FOK is high but SBAD exceeds the threshold FLEVEL (SBAD>FLEVEL), the compensation signal FEOFT_DEFECT or TEOFT_DEFECT is set to 0.

Figure 4:
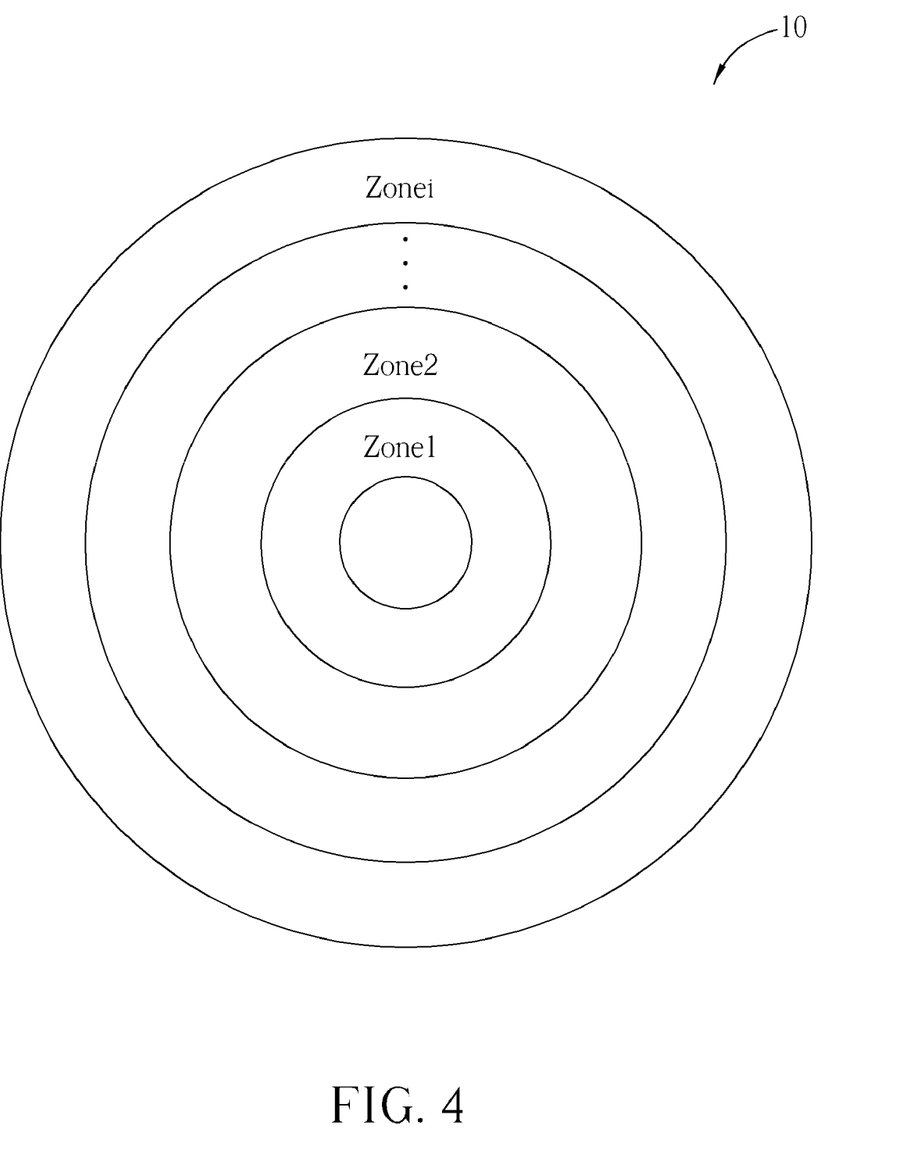
FIG. 4 shows a simplified diagram of the optical medium divided into a plurality of circular zones $Z1, Z2, \ldots, Zi$.

In some embodiments, the optical medium 10 as shown in FIG. 4 is segmented into a plurality of circular zones $Z1, Z2, \ldots, Zi$, for example, 15 zones in total. During playback, a current zone of a current data accessing location is checked and compared to a previous zone of a previous data accessing location to determine whether the servo defect compensation needs to be triggered. If the current zone is different from the previous zone, the system performs servo defect compensation, for example, a predicted compensation value FEOFT_PROT and TEOFT_PROT is utilized to compensate the focus error signal and tracking error signal.

Figure 5:
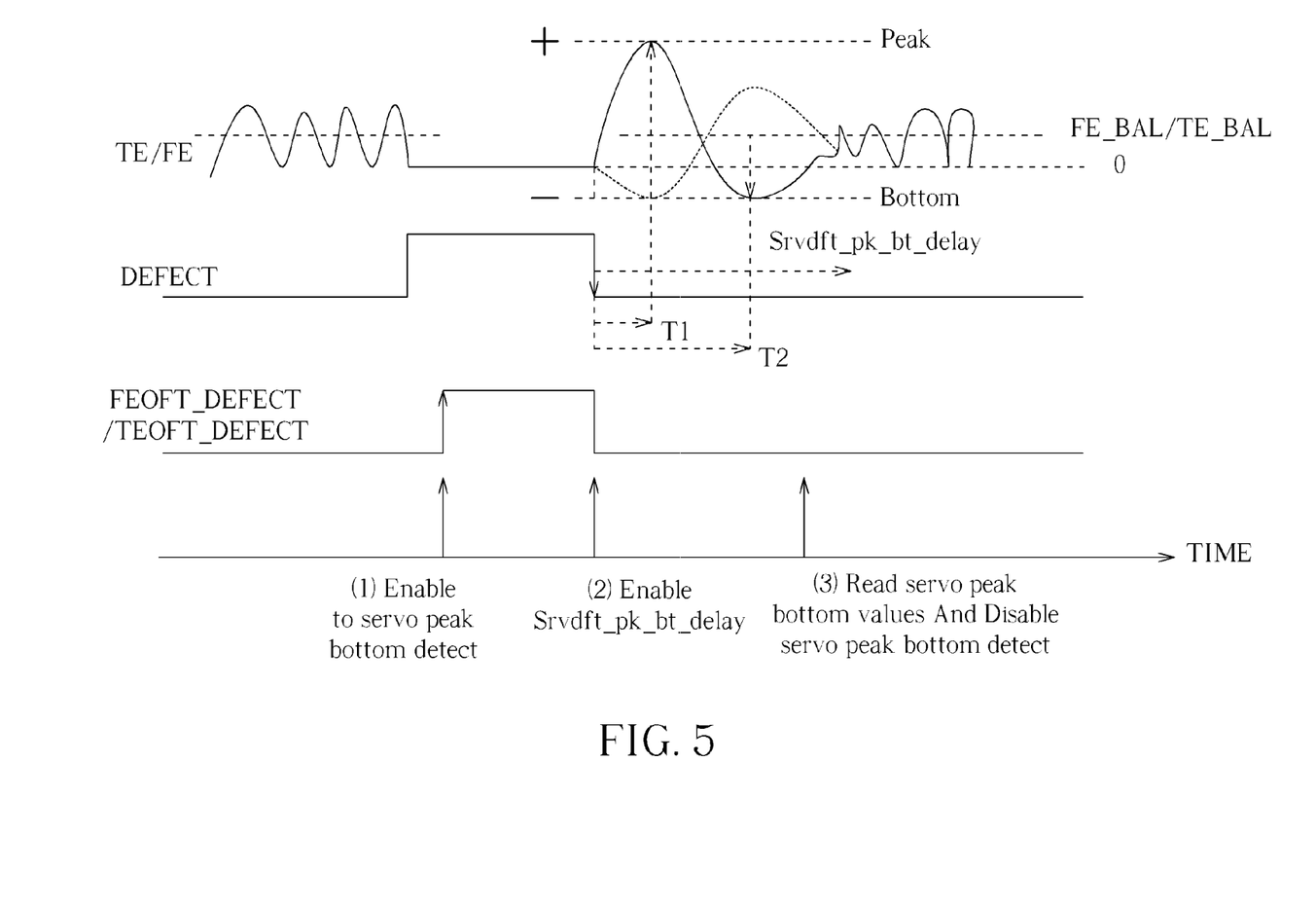
FIG. 5 shows a simplified timing diagram of the focus error signal FE/tracking error signal TE, the defect signal DEFECT, and the compensating signal FEOFT_DEFECT/TEOFT_DEFECT.

FIG. 5 shows a simplified timing diagram of the focus error signal FE or tracking error signal TE, the defect signal DEFECT, and the compensating signal FEOFT_DEFECT or TEOFT_DEFECT. As shown in FIG. 5, after the optical pickup unit 12 in FIG. 1 detects a defect, a servo peak bottom detection is enabled for calculating an offset of FE or TE of the optical disc drive system 1000. When FEOFT_DEFECT or TEOFT_DEFECT signal changes to low, the servo peak bottom detection is continued for a predetermined delay srvdft_pk_bt delay. The servo peak bottom detection results are obtained for computing the offset caused by the defect. In some embodiments, a deviation result FE_DEV or TE_DEV is calculated according to the peak value or the bottom value of FE or TE and the intentional bias FE_BAL or TE_BAL by the following formula (1):

$$FE\_DEV/TE\_DEV = (Peak\ or\ Bottom)\ at\ T1 - FE\_BAL/TE\_BAL \quad (1)$$

Next, a new compensation value FEOFT_PROT_new or TEOFT_PROT_new of the embodiment is derived from a current compensation value FEOFT_PROT_now or TEOFT_PROT_now, the deviation result FE_DEV or TE_DEV, and a gain GAIN_FE or GAIN_TE by the following formulae (2) and (3):

$$FEOFT\_PROT\_new = FEOFT\_PROT\_now + FE\_DEV/GAIN\_FE \quad (2)$$

$$TEOFT\_PROT\_new = TEOFT\_PROT\_now + TE\_DEV/GAIN\_TE \quad (3)$$

The new compensation value FEOFT_PROT_new or TEOFT_PROT_new is then updated to the DSP command to compensate FE or TE after passing the detected defect. The servo defect compensation method of the embodiments detects and predicts a direction or/and an amount of FE or TE offset caused by a disc defect based on the focus error signal FE or tracking error signal TE. When crossing the disc defect, FE or TE is compensated by combining with a predicted FE or TE compensation value to make the servo control approaches the actual focusing point or tracking point after passing the defect area. In comparison to the system without the servo defect compensation method, the servo control needs a greater transient response to track the actual focusing or tracking point after crossing the defect on the disc.

Figure 6:
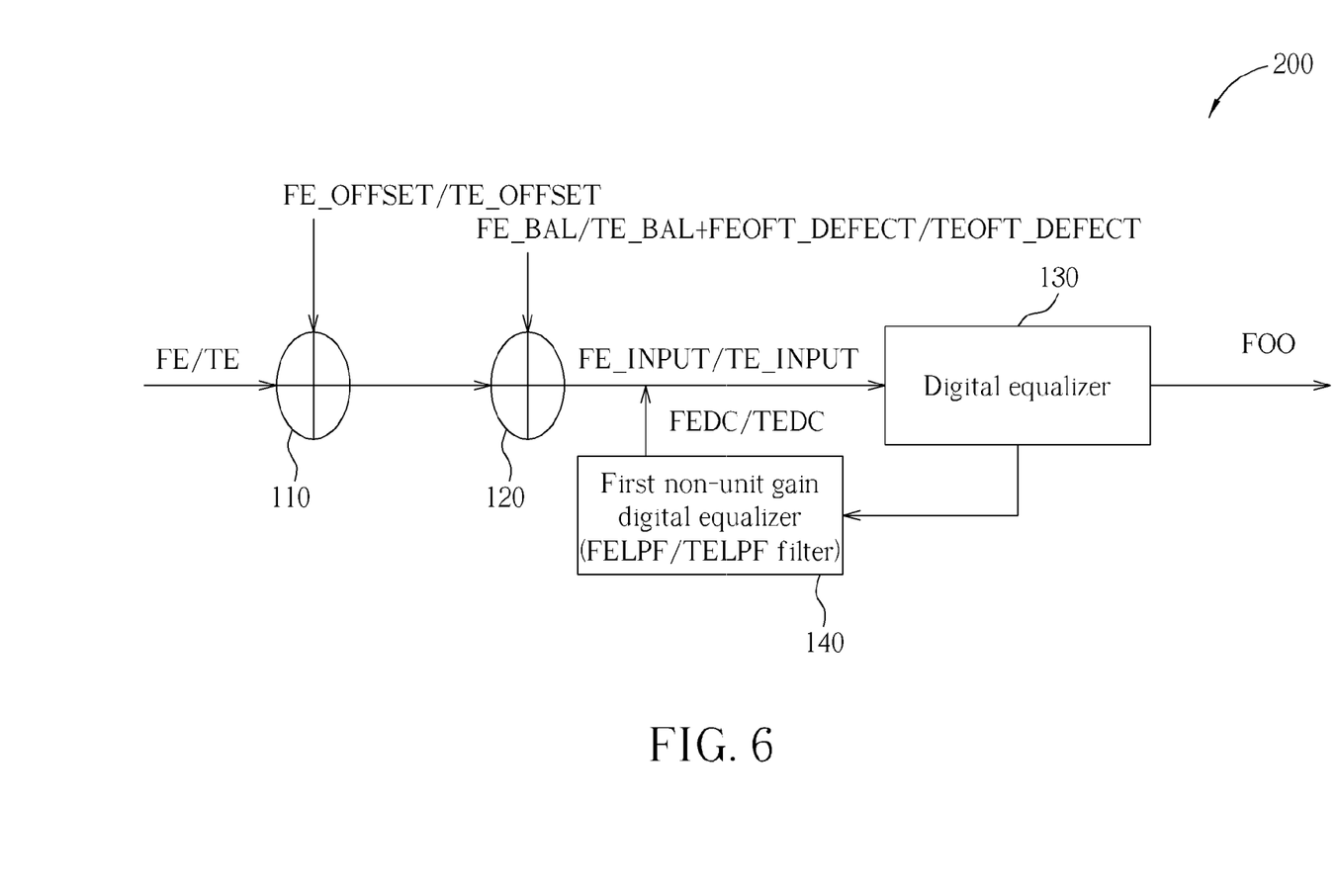
FIG. 6 shows a simplified block diagram of a DSP in the optical disc drive in accordance with the second embodiment of the invention.

In a second embodiment, a method for performing the servo defect compensating operation is conducted by compensating a focus error DC signal FEDC or tracking error DC signal TEDC in the optical disc drive system 1000. FIG. 6 shows a simplified block diagram of a DSP 200 for replacing the DSP 100 in the optical disc drive system 1000 in accordance with the second embodiment. Compared with the DSP 100 in FIG. 2, the DSP 200 further comprises a first non-unity gain digital equalizer 140; the remaining elements of the DSP 200 may be the same as those of the DSP 100, thus further explanation of the configuration details of these elements are omitted herein for the sake of brevity. The first non-unit gain digital equalizer 140, we designed the DC gain of TE_LPF or TE_LPF (equalizer 140) as non-unit gain that called as FEDC/TEDC. The first non-unity gain digital equalizer 140 equalizes FE_LPF or TE_LPF derived by the digital equalizer 130 during a defect crossing period. The signals FEDC or TEDC that from FE_LPF or TE_LPF can be compensated by varying magnitudes and direction of the signals to allow the focus or tracking servo locates at somewhere closer to the actual focusing and tracking point.

The second embodiment may utilize formulae (4) and (5) to derive the compensated focus error DC signal and tracking error DC signal similar to formulae (2) and (3) of the first embodiment.

$$FEDC\_new = FEDC\_now + FE\_DEV/GAIN\_FEDC \quad (4)$$

$$TEDC\_new = TEDC\_now + TE\_DEV/GAIN\_TEDC \quad (5)$$

Figure 7:
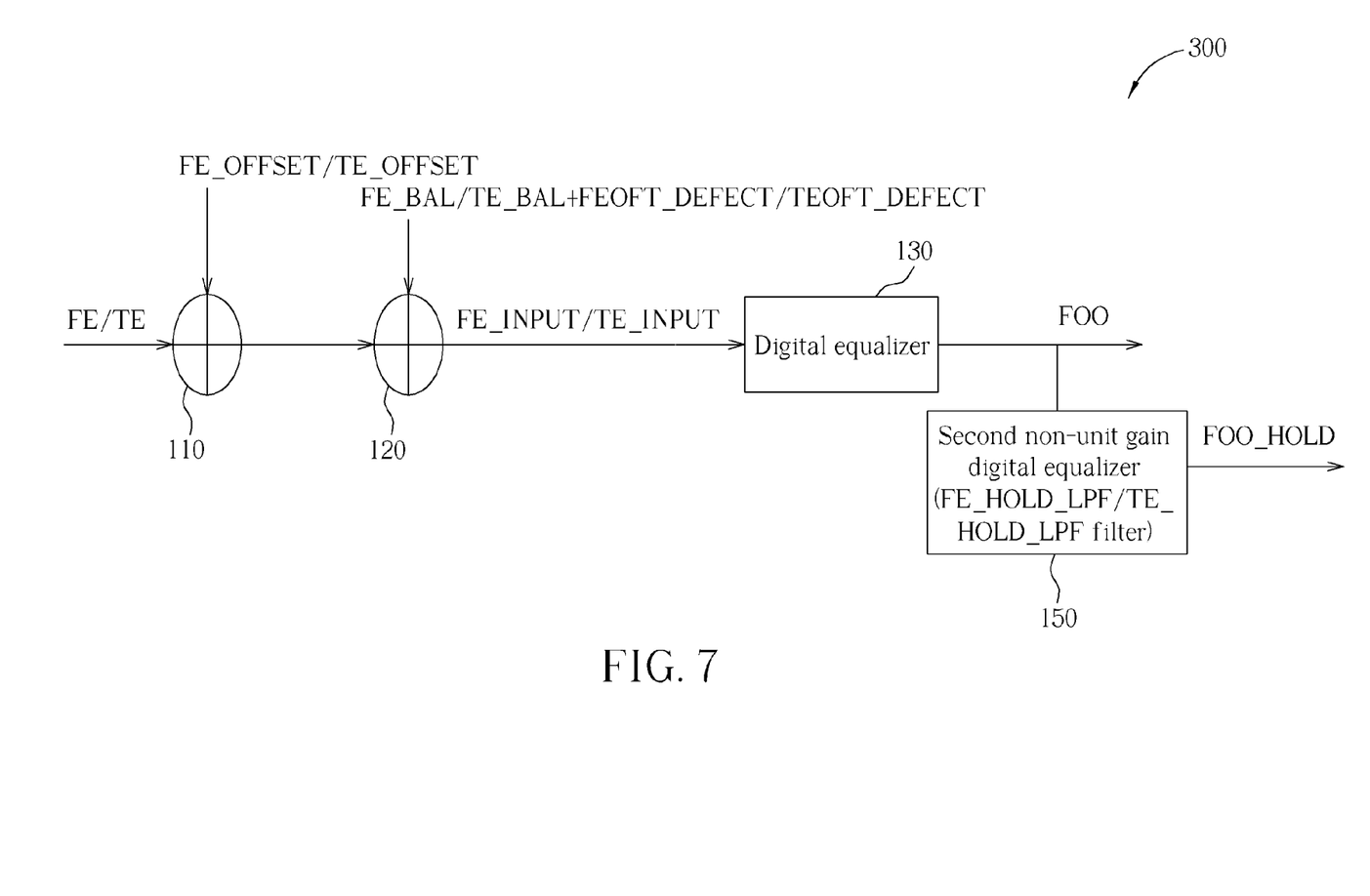
FIG. 7 shows a simplified block diagram of a DSP in the optical disc drive in accordance with the third embodiment of the invention.

In a third embodiment, a method for performing the servo defect compensating operation is conducted by compensating a focus servo output hold signal FOO_HOLD or tracking servo output hold signal TRO_HOLD in the optical disc drive system 1000. FIG. 7 shows a simplified block diagram of a DSP 300 for replacing the DSP 100 in the optical disc drive system 1000 in accordance with the third embodiment. Compared with the DSP 100 in FIG. 1, the DSP 300 further comprises a second non-unity gain digital equalizer 150; the remaining elements of the DSP 300 may be the same as those of the DSP 100, and thus further explanation of the configuration details of these elements are omitted herein for the sake of brevity. The second non-unity gain digital equalizer 150 compensates the focus servo output hold signal FOO_HOLD or tracking servo output hold signal TRO_HOLD. The second non-unity gain digital equalizer 150 equalizes (FOO_HOLD_LPF or TRO_HOLD_LPF) the servo output FOO_HOLD or TRO_HOLD during a defect crossing period. FOO_HOLD or TRO_HOLD that from FOO_HOLD_LPF or TRO_HOLD_LPF can be compensated by varying magnitudes and direction of the signals to allow the focus or tracking servo locates at somewhere closer to the actual focusing and tracking point.

The third embodiment may utilize formulae (6) and (7) to derive the compensated focus servo output hold signal and tracking servo output hold signal similar to formulae (2) and (3) of the first embodiment.

$$\text{FOOHOLD\_new} = \text{FOOHOLD\_now} + \text{FE\_DEV}/\text{GAIN\_FOOHOLD} \quad (6)$$

$$\text{TROHOLD\_new} = \text{TROHOLD\_now} + \text{TE\_DEV}/\text{GAIN\_TROHOLD} \quad (7)$$

Please note that the above embodiments are only for illustrative purposes and are not meant to be limitations of the present invention. In other embodiments, for example, the methods of the first embodiment, the second embodiment, and the third embodiment can be combined for performing the servo defect compensating operation.

Briefly summarized, the method and the optical disc drive system with the DSP disclosed by the present invention can perform the servo defect compensating operation in real time for an optical disc drive system comprising an optical pick-up unit for reading an optical medium having at least a defect, so as to let the focus/tracking servo approach the focus/tracking point and thereby improve the RF quality.

Those skilled in the art will readily observe that numerous modifications and alterations of the device and method may be made while retaining the teachings of the invention.

What is claimed is:

1. A method for performing a servo defect compensating operation by compensating a servo-related signal in an optical disc drive, comprising:
    reading an optical medium by an optical pick-up unit;
    detecting whether a defect exists;
    when the defect on the optical medium is detected, determining a new compensation value based on a servo error signal; and
    compensating the servo-related signal with the new compensation value during defect crossing to adjust servo control when the optical pick-up unit passes the defect;
    wherein the optical medium is segmented into a plurality of circular zones, and the servo defect compensating operation is performed when the optical pick-up unit accesses data from a zone different to a previous accessing zone.

2. The method of claim 1, further comprising:
    detecting the servo error signal of the optical disc drive to generate a detection result; and
    calculating the new compensation value according to a current compensation value, the detection result, and a gain value.

3. The method of claim 2, wherein the step of detecting the servo error signal of the optical disc drive to generate the detection result comprises:
    detecting a peak value or a bottom value of the servo error signal; and
    calculating the detection result according to a deviation value of the peak value or bottom value of the servo error signal and a balance value of the servo error signal.

4. The method of claim 1, wherein the servo error signal is a focus error signal.

5. The method of claim 4, wherein the servo-related signal is a focus error signal.

6. The method of claim 4, wherein the servo-related signal is a focus error DC signal, and the focus error DC signal is equalized through a non-unity gain.

7. The method of claim 4, wherein the servo-related signal is a focus servo output hold signal, and the focus servo output hold signal is equalized through a non-unity gain.

8. The method of claim 1, wherein the servo error signal is a tracking error signal.

9. The method of claim 8, wherein the servo-related signal is a tracking error signal.

10. The method of claim 8, wherein the servo-related signal is a tracking error DC signal, and the tracking error DC signal is equalized through a non-unity gain.

11. The method of claim 8, wherein the servo-related signal is a tracking servo output hold signal, and the tracking servo output hold signal is equalized through a non-unity gain.

12. The method of claim 1, wherein the new compensation value corresponds to a servo offset caused by the defect.

13. The method of claim 1, wherein the new compensation value is determined by a predetermined value and a detected direction of a servo offset caused by the defect.

14. The method of claim 1, wherein the defect is detected and a focus servo on indicator is high.

15. An optical disc drive system for performing a servo defect compensating operation by compensating a servo-related signal, comprising:
    an optical pick-up unit, for reading an optical medium; and
    a digital signal processor (DSP), for detecting whether a defect exists by monitoring a side beam signal, and determining a new compensation value based on a servo error signal when the defect on the optical medium is detected, and compensating the servo-related signal with the new compensation value during defect crossing to adjust servo control when the optical pick-up unit passes the defect;
    wherein the optical medium is segmented into a plurality of circular zones, and the servo defect compensating operation is performed when the optical pick-up unit accesses data from a zone different to a previous accessing zone.

16. The optical disc drive system of claim 15, wherein the DSP further detects the servo error signal of the optical disc drive to generate a detection result, and calculates the new compensation value according to a current compensation value, the detection result, and a gain value.

17. The optical disc drive system of claim 16, wherein the DSP further detects a peak value or a bottom value of the servo error signal, and calculates the detection result according to a deviation value of the peak value or bottom value of the servo error signal and a balance value of the servo error signal when detecting the servo error signal of the optical disc drive to generate the detection result.

18. The optical disc drive system of claim 15, wherein the servo error signal is a focus error signal.

19. The optical disc drive system of claim 18, wherein the servo-related signal is a focus error signal.

20. The optical disc drive system of claim 18, wherein the servo-related signal is a focus error DC signal, and the focus error DC signal is equalized by a non-unity gain digital equalizer in the DSP.

21. The optical disc drive system of claim 18, wherein the servo-related signal is a focus servo output hold signal, and the focus servo output hold signal is equalized by a non-unity gain digital equalizer in the DSP.

22. The optical disc drive system of claim 15, wherein the servo error signal is a tracking error signal.

23. The optical disc drive system of claim 22, wherein the servo-related signal is a tracking error signal.

24. The optical disc drive system of claim 22, wherein the servo-related signal is a tracking error DC signal, and the tracking error DC signal is equalized by a non-unity gain digital equalizer in the DSP.

25. The optical disc drive system of claim 22, wherein the servo-related signal is a tracking servo output hold signal, and the tracking servo output hold signal is equalized by a non-unity gain digital equalizer in the DSP.

26. The optical disc drive system of claim 15, wherein the new compensation value corresponds to a servo offset caused by the defect.

27. The optical disc drive system of claim 15, wherein the new compensation value is determined by a predetermined value and a detected direction of a servo offset caused by the defect.

28. The optical disc drive system of claim 15, wherein the defect is detected when the side beam signal is less than a threshold and a focus servo on indicator is high.

29. A method for performing a servo defect compensating operation by compensating a servo-related signal in an optical disc drive, comprising:

reading an optical medium by an optical pick-up unit;

detecting whether a defect exists by detecting the servo error signal of the optical disc drive to generate a detection result;

when the defect on the optical medium is detected, determining a new compensation value based on a servo error signal by calculating the new compensation value according to a current compensation value, the detection result, and a gain value; and compensating the servo-related signal with the new compensation value during defect crossing to adjust servo control when the optical pick-up unit passes the defect.

30. An optical disc drive system for performing a servo defect compensating operation by compensating a servo-related signal, comprising:

an optical pick-up unit, for reading an optical medium; and a digital signal processor (DSP), for detecting whether a defect exists by monitoring a side beam signal, and determining a new compensation value based on a servo error signal when the defect on the optical medium is detected, and compensating the servo-related signal with the new compensation value during defect crossing to adjust servo control when the optical pick-up unit passes the defect;

wherein the DSP further detects the servo error signal of the optical disc drive to generate a detection result, and calculates the new compensation value according to a current compensation value, the detection result, and a gain value.

* * * * *